(12) United States Patent
Soma et al.

(10) Patent No.: US 6,320,674 B1
(45) Date of Patent: Nov. 20, 2001

(54) IMAGE FORMING APPARATUS

(75) Inventors: Utami Soma; Atsushi Takahashi; Kazumichi Yamauchi; Ryuji Okutomi; Susumu Kurihara, all of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/106,027

(22) Filed: Jun. 29, 1998

(30) Foreign Application Priority Data

Jul. 3, 1997 (JP) .................................................. 9-178277

(51) Int. Cl.$^7$ ............................ B41B 15/00; B41J 15/00; G03G 15/00; G03G 21/00
(52) U.S. Cl. ...................... 358/1.9; 358/1.12; 358/1.15; 358/1.16; 358/296; 399/364; 399/374; 399/383; 271/3.03; 271/3.15
(58) Field of Search ..................................... 358/1.16, 1.9, 358/1.13, 1.15, 1.17, 1.12, 296, 501, 496, 498; 399/18, 364, 374, 402, 383, 368, 373; 271/3.03, 3.04, 3.15

(56) References Cited

U.S. PATENT DOCUMENTS

| 5,522,017 | * | 5/1996 | Ueda .................................... 358/1.16 |
| 5,671,463 | * | 9/1997 | Morikawa et al. ..................... 399/86 |
| 5,966,556 | * | 10/1999 | Nakagawa et al. .................... 399/18 |

* cited by examiner

Primary Examiner—Kimberly A. Williams
Assistant Examiner—Twyler Lamb
(74) Attorney, Agent, or Firm—Frishauf, Holtz, Goodman, Langer & Chick

(57) ABSTRACT

An image forming apparatus is equipped with a document reading device for reading image data on a document at a reading section; a memory to store the image data therein, the memory capable of storing the image data of plural pages of documents; and an image recording system for recording an image on a recording sheet based on the image data stored in the memory. A recording sheet reversing system receives the recording sheet from the image recording system, wherein the image is recorded on one side of the recording sheet, reverses the recording sheet, and refeeds the reversed recording sheet to the image recording system without stacking the recording sheet, whereby another image is recorded on the other side of the recording sheet by the image recording system. A controller controls the document reading device and the image recording system such that, when images are recorded on both sides of a recording sheet by the recording sheet reversing system, after image data of a predetermined number of pages of documents are read by the image recording system and are stored in the memory, the image recording system starts recording images based on the image data stored in the memory simultaneously as the document reading device successively reads other pages of documents.

12 Claims, 6 Drawing Sheets

IMAGE FORMING APPARATUS

BACKGROUND OF THE INVENTION

The present invention relates to an image forming apparatus, and in particular, to an image forming apparatus wherein the image recording time for recording a document composed of plural sheets by conducting image recording the document is shortened.

Recently, functions required for an image forming apparatus (hereinafter, represented by a copying machine for explanation) have been diversified, and in particular, automatic and rapid copying processing is strongly demanded for improving work efficiency for a user, and there is a strong demand for the so-called double-sided copying to record images on both of the obverse and reverse sides of a recording sheet (hereinafter referred to also as copying simply) from the viewpoint of natural resources conservation and filing space.

On the other hand, due to the recent office automation, various business machines are required to be installed in limited installation space, and small-sized business machines are strongly demanded for space saving. To satisfy these demands of automation, high speed and miniaturization, an image forming apparatus is available wherein plural sets of a document can be recorded by copying the document in the order of its pages for each set of the document while reversing the document and a recording sheet.

In the case of double-sided copying, in particular, in the method wherein a recording sheet is reversed to be sent again to the recording section without being stacked after being recorded on its one side, it is not necessary to separate and feed a stacked recording sheet again, and problems such as sheet jamming and others are hardly caused, and reliability is high.

In the case of a digital image recording apparatus, moreover, recording operations have been started after reading all image data of a document first and storing them in a memory in the double-sided copying stated above.

In the aforesaid method, however, it takes time to complete the recording for the first one set and there still is room for improvement of productivity. In particular, when the first one set of copies is required to be finished promptly first of all, among plural sets of copies which are required, this request can not be satisfied in the aforesaid method, which is a problem.

On the other hand, a method wherein recording is carried out for each page simultaneously with reading of image data on the first part of a document has also been proposed. Since recording operations are conducted harmonizing with the speed of reading image data in this case, when the reading speed is low, the recording speed has to be slowed down by means of interruption of recording operations or the like. However, in the double-sided copying method wherein the recording sheets are not stacked, plural recording sheets are conveyed through a conveyance path simultaneously, and if this is interrupted, it is difficult to convey these plural recording sheets, resulting in a decline of the recording speed and complicated control of conveyance timing for recording sheets.

Especially, when conducting reading and outputting for a double-sided document simultaneously, it is difficult to read at high speed through reversing because it is necessary for a reading unit to set a document at a prescribed position by turning the document in succession to read, while, an output unit can output at high speed if image information is already stored in a memory. From this point, it is impossible to improve productivity in the synchronized operations of the reading unit and the output unit, which is a problem.

SUMMARY OF THE INVENTION

The invention has been achieved in view of the conventional problems mentioned above, and its object is to provide an image forming apparatus and an image forming system wherein, in a mode to record a document by recording the document in the order of its pages one by one, one set of document images can be recorded quickly and thereby the time required for all copies can be shortened as far as possible.

The above object can be attained by the following image forming apparatus and the following image forming system.

An image forming apparatus comprising:

a document reading device for reading image data on a document at a reading section;

document conveying system for conveying the document to the reading section of the document reading device;

a memory to store the image data therein, the memory capable of storing the image data of plural pages of documents;

image recording system for recording an image on a recording sheet based on the image data stored in the memory;

recording sheet reversing system for receiving the recording sheet from the image recording system, wherein the image is recorded on one side of the recording sheet, for reversing the recording sheet, and for refeeding the reversed recording sheet to the image recording system without stacking the recording sheet, whereby another image is recorded on the other side of the recording sheet by the image recording system; and controller for controlling the document reading device and the image recording system such that, when images are recorded on both sides of a recording sheet by the recording sheet reversing system, after image data of a predetermined number of pages of documents are read by the image recording system and are stored in the memory, the image recording system starts recording images based on the image data stored in the memory simultaneously as the document reading device successively reads other pages of documents.

An image forming system, comprising:

a first memory in which image data of plural pages are stored;

an image recording apparatus for recording an image on a recording sheet based on image data, comprising;

image receiving section for receiving image data from the first memory;

a second memory to store image data of plural pages received through the image receiving section;

image recording system for recording an image on a recording sheet based on the image data stored in the memory;

recording sheet reversing system for receiving the recording sheet from the image recording system, wherein the image is recorded on one side of the recording sheet, for reversing the recording sheet, and for refeeding the reversed recording sheet to the image recording system without stacking the recording sheet, whereby another image is recorded on the other side of the recording sheet by the image recording system; and controller for controlling the image recording system such that, when images are recorded on both sides of a recording sheet by the recording sheet reversing system, after image data of a predetermined number of pages are stored in the second memory, the image recording system starts recording images based on the image data stored in the second memory simultaneously as other image data are successively received through the image receiving section and are stored in the second memory.

Further, the above object can be attained by the following preferable embodiments indicated in each of the following items.

Item 1

An image forming apparatus having a mode in which image data of a document composed of plural sheets are recorded on both sides of a recording sheet in order of document pages, and thereby plural sets of the document are recorded one set by one set, wherein, with regard to recording of the first one set, the document is stored in a reading memory up to the prescribed number of sheets of the document, and after that, recording on a recording sheet is started by reading image data out of the aforesaid memory simultaneously with continuation of reading operation.

In the invention of Item 1, in the recording for the first one set, prescribed number of sheets of the document are stored in the reading memory, first. After that, the reading operation is naturally continued, and image data are read out of the memory simultaneously with the reading operation, and recording on a recording sheet is started.

The recording for the second one set and the following sets are conducted based on the image data stored in the memory without the reading operation.

Item 2

An apparatus having therein a memory means capable of storing image data for plural pages of a document as shown in FIG. 1, a reading means which conveys a document to the prescribed position, and stores image data of the document in the memory means after reading the image data, and a reading record control means which is structured to be capable of processing simultaneously with the aforesaid reading and storing operations, and reads the document up to the prescribed number of sheets of the document, and stores them in the memory means for the recording of the first one set in a mode to record plural sets of the stored image data one set by one set in the order of pages from the memory means, then reads image data from the memory means simultaneously with the continuation of the reading operation to start the recording on a recording sheet.

In the invention of Item 2, in the case of the mode to record plural sets of the image data stored in the memory means one set by one set in the order of pages, the document up to the prescribed number of sheets thereof is first read and stored in the memory means for the recording of the first one set through the control of the reading means by the reading record control means. Even after that, the reading record control means controls the reading means, and feeds the document to the prescribed position to read image data of the document, and reads image data out of the memory means while continuing the operation of reading the image data stored in the memory means, to start the recording on a recording sheet.

Item 3

An arrangement wherein, when the reading and storing operations are continued after completion of an operation to read out image data and an operation to images for the aforesaid prescribed number of sheets, the operation to read out from the memory is interrupted and operations for reading out and recording are started again after the following operation for reading up to the prescribed number of sheets.

On the occasion where the speed of reading out is higher than that of reading and storing, when the reading and storing operations are continued after completion of an operation to read out image data for the prescribed number of sheets, the operation to read out is interrupted and operations for reading out and recording are started again after the following operation for reading up to the prescribed number of sheets, in the invention of Item 3. This operations are repeated when the number of sheets of the document is large.

Item 4

An apparatus which is equipped with a mechanism to read from the last page to the first page of a document in succession in the aforesaid mode and is structured to be applied to the mode for recording image data of both sides of a document on both sides of a recording sheet.

The invention of Item 4 can be applied automatically to double-sided document—double-sided recording mode (2—2 mode) because it is a mode wherein pages recorded on a recording sheet are not shifted (a mode wherein the first page surface of a recording sheet does not turn out blank). However, when reading from the last page, it is not possible to apply automatically to single-sided document—double-sided recording mode (1–2 mode) because it is a mode wherein page shifting is caused when the number of sheets of a document is odd.

Item 5

An apparatus which is equipped with a mechanism to read from the first page to the last page of a document in succession in the aforesaid mode and is structured to be applied to both of the mode for recording image data of one side of a document on both sides of a recording sheet and the mode for recording image data of both sides of a document on both sides of a recording sheet.

When reading from the first page, page shifting is not caused in the single-sided document—double-sided recording mode let alone double-sided document—double-sided recording mode.

Therefore, the invention of Item 5 is applied also to the occasion for recording on a recording sheet in either of the single-sided document—double-sided recording mode and the double-sided document—double-sided recording mode.

Item 6

The structure equipped with a mechanism wherein a recording sheet whose one side has been subjected to recording at a recording section is reversed to be conveyed again to the recording section, then is subjected to recording on its reverse side, and is ejected out.

In the invention of Item 6, a recording sheet whose one side has been subjected to recording at a recording section is reversed, then conveyed again to the recording section and is ejected out after being subjected to recording on the reverse side by the aforesaid mechanism, in the double-sided recording mode.

Item 7

The structure equipped with a mechanism wherein a document whose one side has been read at a prescribed position is reversed to be conveyed again to the prescribed position, and is ejected out after being subjected to reading of the reverse side thereof.

In the invention of Item 7 a document whose one side has been read at a prescribed position is reversed, then is conveyed again to the prescribed position, and is ejected out after being subjected to reading of the reverse side thereof by the aforesaid mechanism in recording of the double-sided document.

DETAILED DESCRIPTION OF THE PREFERRED EMBODIMENT

An embodiment of the invention will be explained as follows with reference to the drawings attached hereto.

Figure 1:
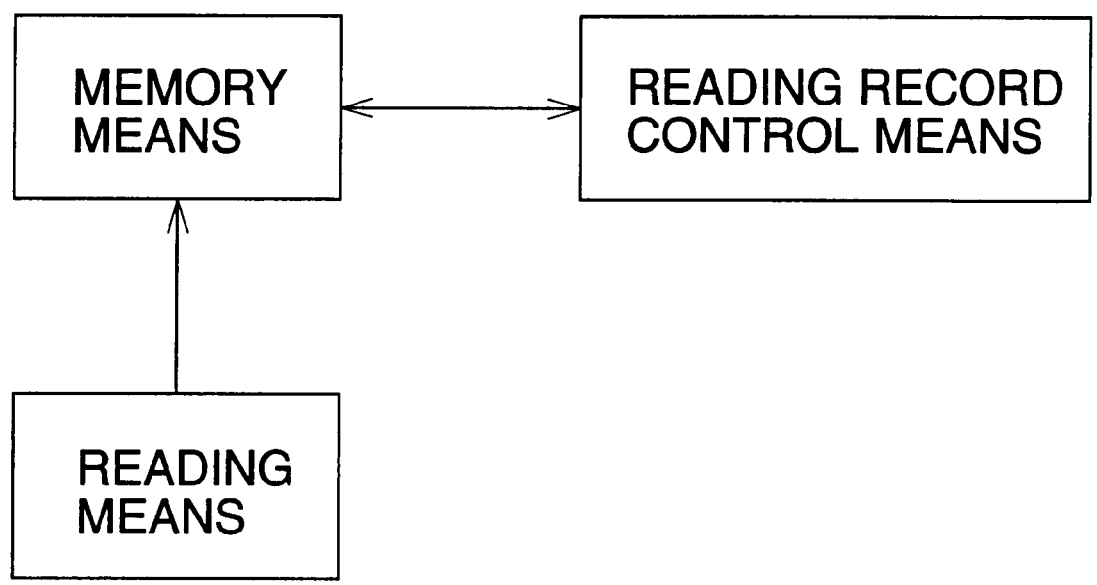
FIG. 1 represents drawings corresponding to Items illustrating the structure of an image forming apparatus of the invention.
Figure 2:
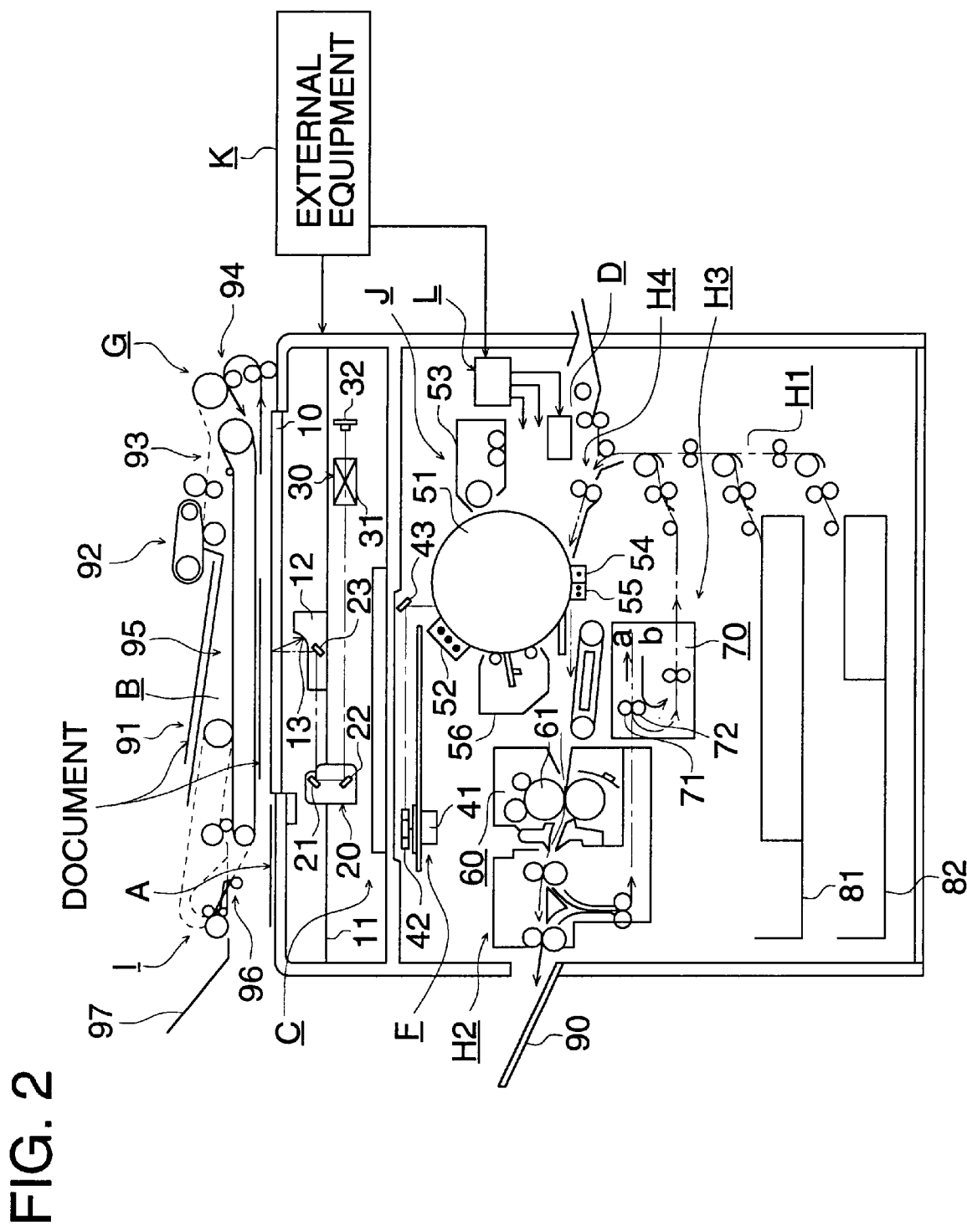
FIG. 2 is a diagram showing the general structure of a copying machine related to an embodiment of the invention.

FIG. 2 shows schematic structure and functions of the copying machine in an embodiment of the invention.

In FIG. 2, copying machine 1 is provided with setting section A, automatic document feeding section B, automatic image reading section C representing a reading means, image processing section D which processes images read by the automatic image reading section C, image storing section E representing a memory means, laser optical system F, automatic document conveyance section G, automatic recording sheet feeding section H1, recording sheet reversing/electing switching section H2, recording sheet reversing-conveyance section H3 and automatic document conveyance section (RADF) G, and is further provided with overall control section I representing a reading record control means which controls operations of each unit section stated later in accordance with directives established by the setting section A.

Figure 3:
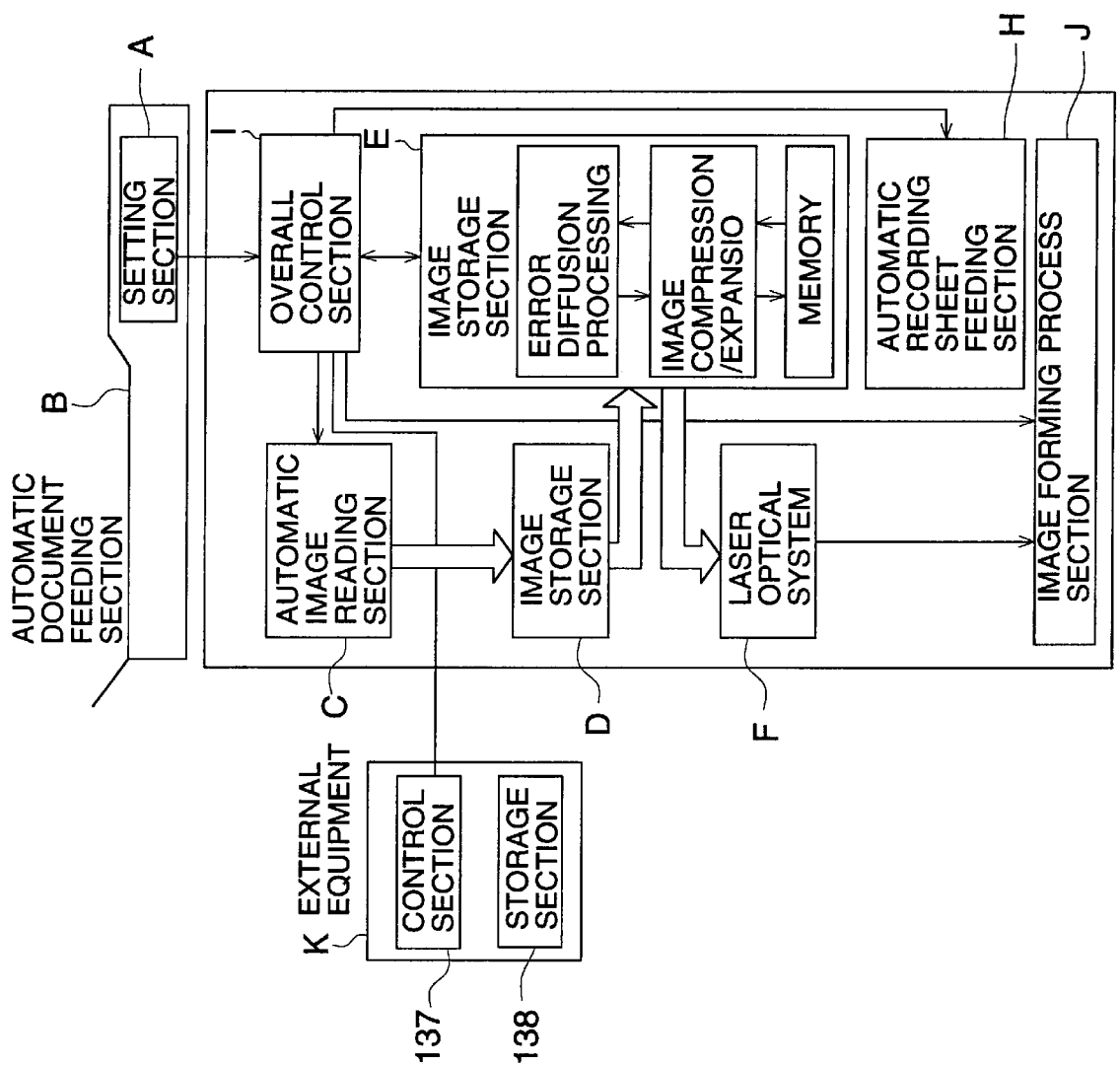
FIG. 3 is a block diagram showing the aforesaid structure.

Detailed operations of the aforesaid sections will be explained in accordance with an overall structure diagram of a hardware shown in FIG. 3.

The setting section A is provided on the top surface of a copying machine as an operation panel, and it is operated by a user to input directives such as a copying mode for the copying section, enlargement and reduction into the aforesaid control unit I. Due to this, each section starts operating.

The automatic document feeding section B is provided on the platen glass 10, and it automatically conveys a document to be read. The automatic document feeding section B is composed with document placing section 91 which holds a group of documents, sheet feeding section 92 which separates a sheet of document from the group of documents and to feed it out, intermediate conveyance section 93 which conveys the document fed from the sheet feeding section 92, conveyance section 95 which conveys a document conveyed by the intermediate conveyance section 93 to the prescribed position on the platen glass 10, reversing section 94 which reverses the document conveyed by the conveyance section 95 from the aforesaid prescribed position in the direction opposite to the aforesaid conveyance direction and feeds it again to the conveyance section 95, and ejecting-reversing section 96 (sheet ejecting section) which ejects the read document to document ejection tray (ejected sheet stacking section) 97 by reversing the document inside out or by leaving two sides of the document as they are, or returns the document to a document placing stand.

A document is fed to the automatic image reading section C by the automatic document feeding section B through operations by the setting section A. The document is placed on platen glass (document stand glass) 10, and the automatic image reading section C illuminates the document with halogen lamp light source 13 provided on carriage 12 which moves on slide rail 11. Movable mirror unit 20 on which paired mirrors 21 and 22 are provided moves on the slide rail 11, and guides reflected light (optical image) from the document on the platen glass 10 to lens reading unit 30, in combination with mirror 23 provided on the carriage 12.

The lens reading unit 30 is composed of image forming lens 31 and CCD line sensor 32.

Optical images which correspond to images on the document and are guided to the aforesaid mirrors 21, 22 and 23 are converged by the image forming lens 31 and thereby are formed as images on a light-intercepting plane of the CCD line sensor 32, and then the linear optical images are converted photoelectrically into electric signals (luminance signals) by the CCD line sensor 32.

The image signals (image data) obtained when images on the document are read by the automatic image reading section C are subjected to various image processing such as density conversion, filter processing, variable magnification processing and γ correction at the image processing section D, and then are outputted to image storing section E.

The image storing section E conducts error diffusion processing and compression processing on the image signals which have been subjected to the image processing, and then stores them in a memory. Data stored in the image storing section E are subjected to extension processing at the prescribed timing, and are outputted to laser optical system F.

To satisfy the functions related to the invention in this case, there is provided a two-way access function which can conduct simultaneously and independently the image signal reading and image processing operations respectively in the image reading section C and in the image processing section D and the image signal storing operations in the image recording section E.

A memory of the image storing section E is structured in terms of sub-division to be capable of storing document records in a unit of a page, and is structured to store image data in a unit of A4 document size, and it is provided with capacity to store up to 30 sheets, for example, of double-sided documents in A4 size. From the memory like this, it is also possible to read by changing the order and to read continuously plural image data selected arbitrary, for example, to read two sheets of A4 size document continuously and to output by enlarging to A3 size.

In the laser optical system F, a laser beam emitted from a semi-conductor laser is modulated based on image signals. The laser beam is rotated for scanning by polygon mirror 42 rotated by driving motor 41, and passes through unillustrated fθ lens, then its optical path is deflected by reflecting mirror 43 to be projected on the surface of photoreceptor drum 51, so that an electrostatic latent image is formed on the photoreceptor drum 51 which is electrically charged uniformly.

The image forming process section J is provided with charging unit 52 for charging the photoreceptor drum 51 uniformly, developing unit 53, transfer electrode 54, separation electrode 55, cleaning unit 56 and fixing unit 60, whereby the electrostatic latent image formed on the photoreceptor drum 51 is developed to be a toner image by the developing unit 53. After the toner image is adsorbed on a recording sheet passing through the photoreceptor drum 51 by electrostatic force, the toner image adsorbed on the recording sheet is fused and fixed on the recording sheet by heat and pressure applied by fixing unit 60 which is structured to include heat rollers 61 and 62. Thus, copies of the document are obtained.

Recording sheets are stacked on cassettes 81 and 82 to be grouped in size, and the automatic recording sheet feeding section H takes a recording sheet out of corresponding cassette 81 or 82 in accordance with the directive of recording sheet size, and the recording sheet is conveyed to the laser optical system M and image forming process section J by conveyance mechanism H structured to include plural conveyance rollers and conveyance belt. The recording sheet whose surface has been subjected to copying as stated above is then conveyed to recording sheet reversing/ejecting switching section H2 in which the conveyance path for the recording sheet is switched, based on signals from control section I, to recording sheet reversing-conveyance mechanism H3 so that copying is made on the reverse side of the recording sheet.

The recording sheet reversing-conveyance mechanism H3 conveys temporarily the recording sheet by a prescribed amount in the direction a in the drawing through rollers 71 and 72, and then reverses the recording sheet without stacking it by reversing the rollers 71 and 72, and conveys the recording sheet in the direction b in the drawing to supply it again to recording sheet conveyance mechanism H4 located at the upstream side of photoreceptor drum 51.

In the copying machine explained above, technology to extend images from the memory and the so-called non-stack and reconveyance system make it possible to output images at the same speed as in single-sided continuous image forming even when forming images on both sides of a transfer sheet.

Figure 4:
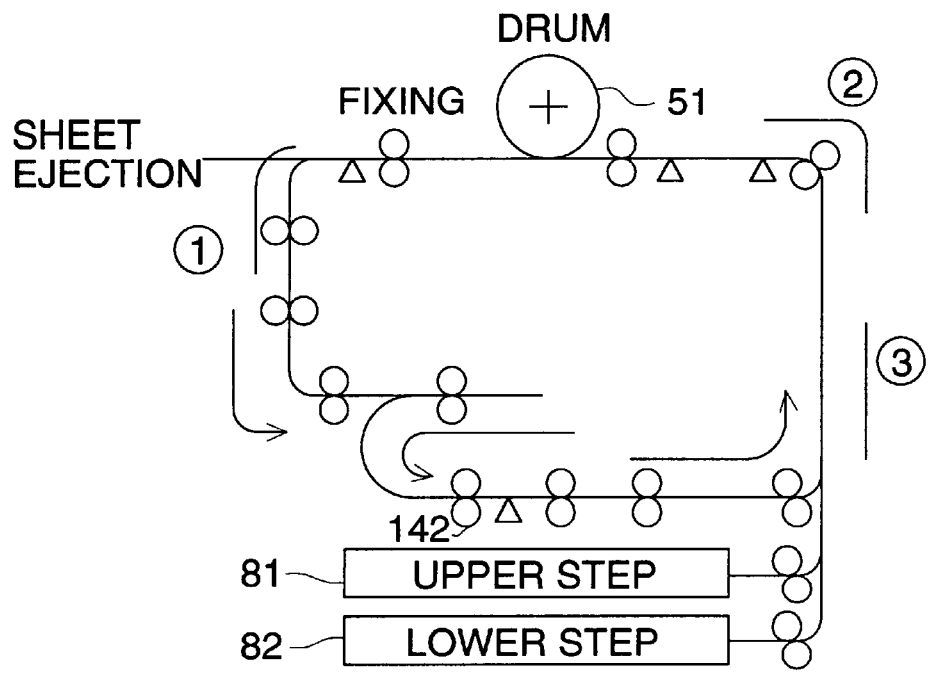
FIG. 4 is a diagram showing the flow of the first step in conveyance of plural recording sheets conducted by an automatic recording sheet feeding section in the foregoing.
Figure 5:
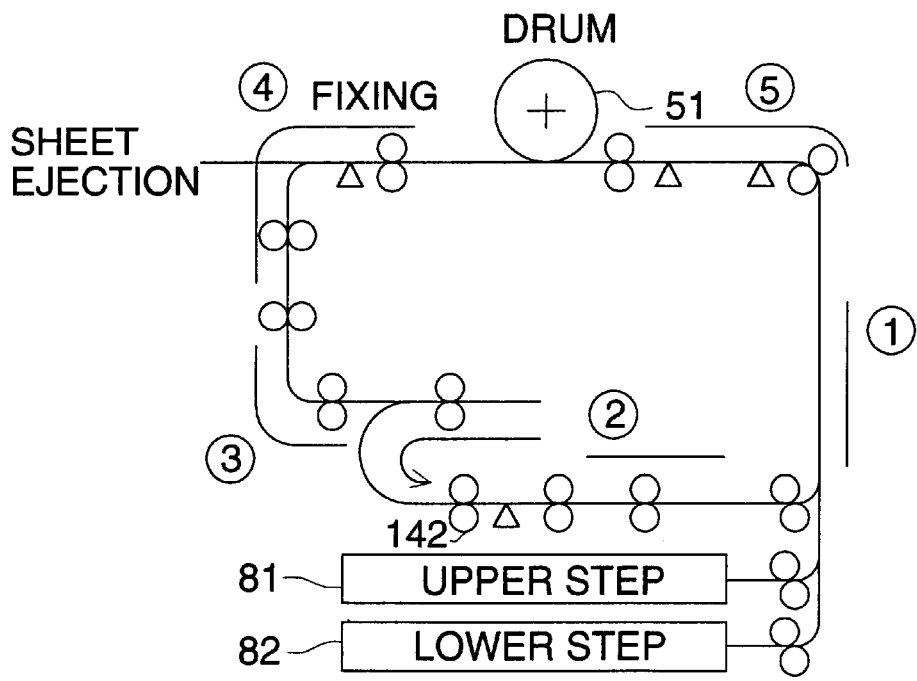
FIG. 5 is a diagram showing the flow of the second step in conveyance of plural recording sheets conducted by an automatic recording sheet feeding section in the foregoing.
Figure 6:
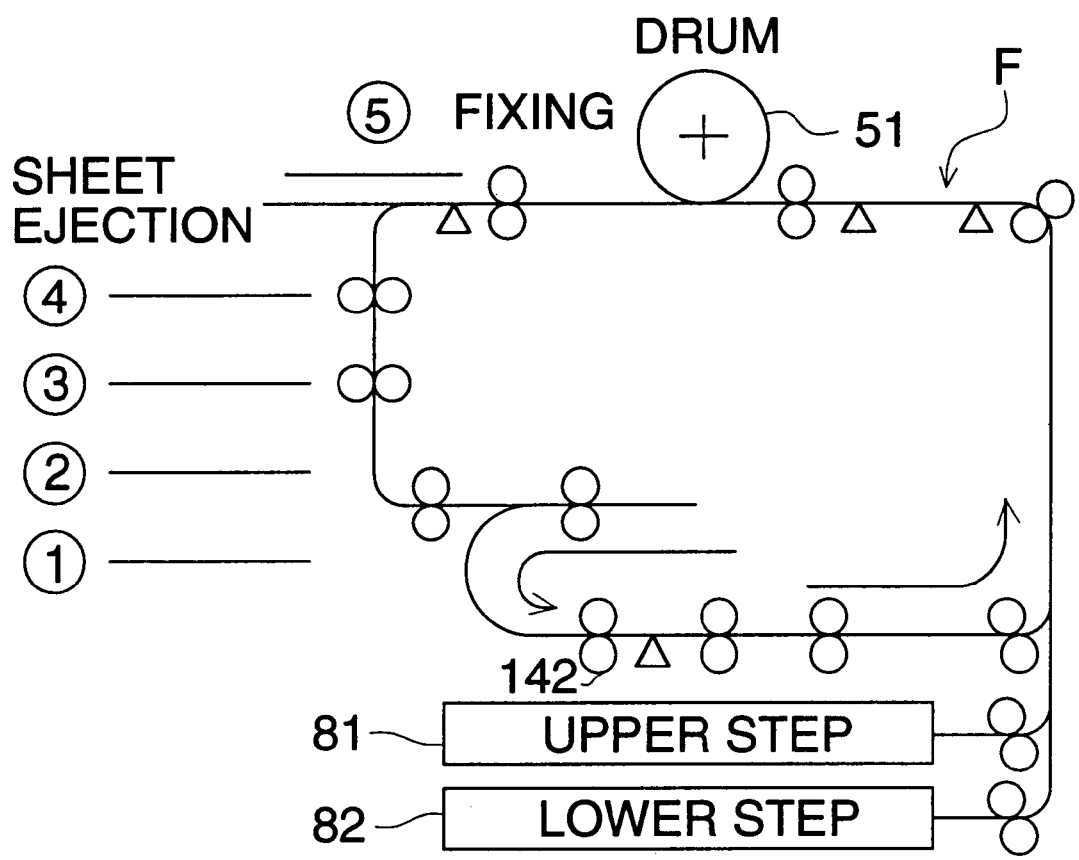
FIG. 6 is a diagram showing the flow of the third step in conveyance of plural recording sheets conducted by an automatic recording sheet feeding section in the foregoing.

Now, each of FIGS. 4–6 shows a flow of conveyance of plural recording sheets conducted by the automatic recording sheet feeding section H. In these drawings, copying is made on the reverse side of each recording sheet in the order of pages 10, 8, 6, 4 and 2 while conveying recording sheets in a unit of five sheets, using upper cassette 81, and then the recording sheets are reversed inside out by reversing roller 142 so that copying may be made on pages 9, 7, 5, 3 and 1 on the obverse side of the recording sheets.

When a recording sheet whose length in its conveyance direction is longer than A4 size is used, for example, when conveying a recording sheet in B4 size from the cassette 81, recording sheets in B4 size are conveyed in a unit of three sheets, and image information of a document are recorded on both sides of each recording sheet.

Figure 7:
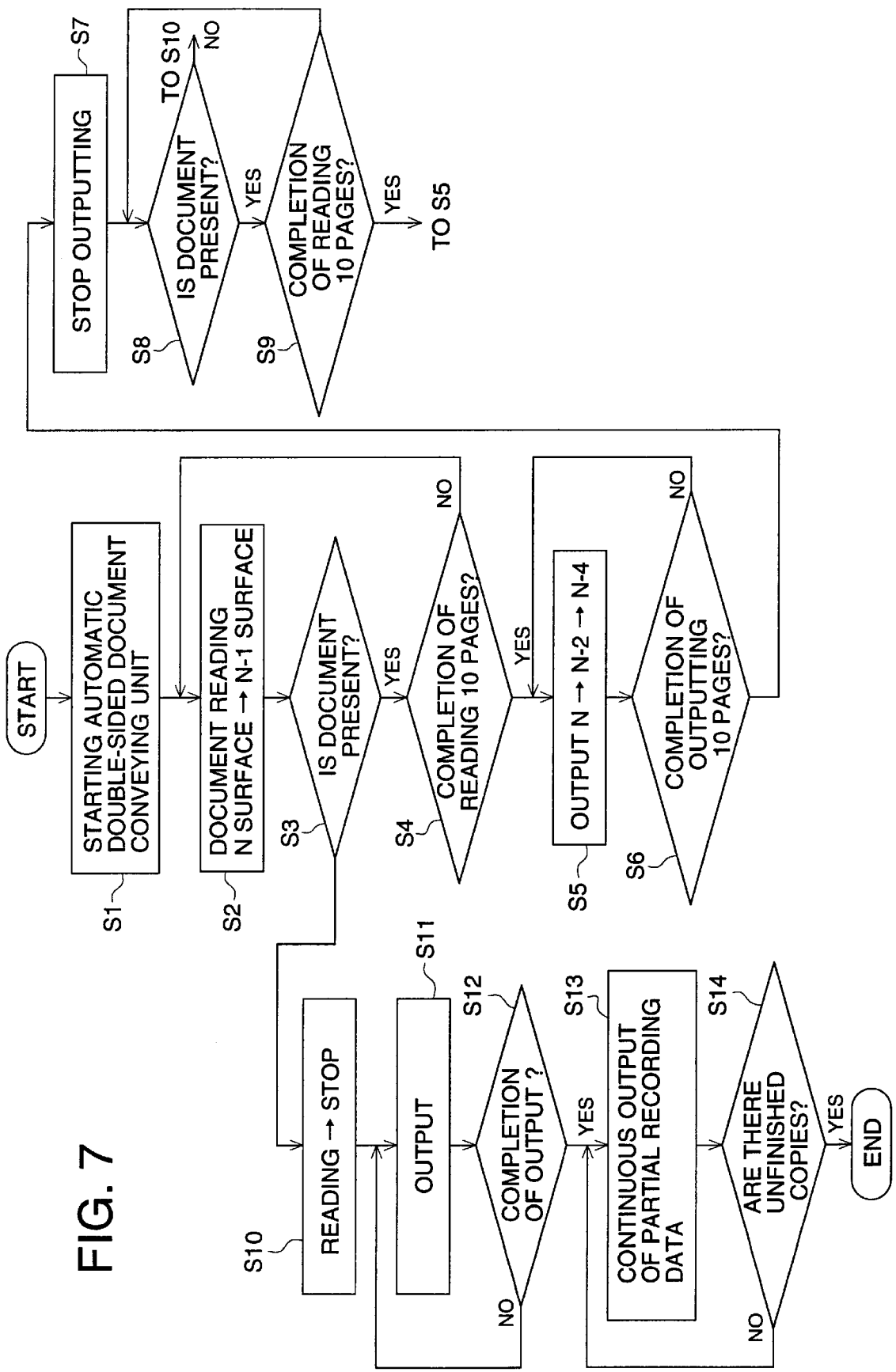
FIG. 7 is a flow chart showing operations of the copying machine in the foregoing.

Next, operations of a copying machine in the embodiment of the invention will be explained based on a flow chart in FIG. 7.

In step ("S") 1, automatic document feeding section (ADF) B is started. In step 2, reading of the document thus fed is started. Upon this start reading, the automatic document feeding section B feeds documents beginning with the lowermost document among plural documents stacked. With regard to reading in this case, the reverse side of the document is read first, and then the obverse side of the reversed document is read. When recording the documents in quantity of n sheets having the total surfaces of 2n=N, the reading is performed in the order of the reverse side of the lowermost n-th sheet (N-th surface), the obverse side of n-th sheet ((N−1)-th surface), the reverse side of (n−1)-th sheet ((N−2)-th surface), the obverse side of (n−1)-th sheet ((N−3)-th surface), . . . .

In step 3, it is judged whether documents remain on document placing section 91 or not. This judgment is made by an output of a document type sensor (not shown) provided on the document placing section 91. When documents remain, the sequence advances to step 4 where it is judged whether reading for the obverse side and the reverse side for each of five sheets, namely for ten surfaces has been completed or not, When judged not to have been completed, the sequence goes back to step 2 to continue reading documents and then advances again to step 3 to judge whether documents remain or not. When the number of surfaces of documents placed on the document placing section 91 exceeds 10 surfaces, namely, when the number of documents exceeds 5 sheets, the aforesaid reading is repeated, and when reading for 10 surfaces is completed, judgment in step 4 indicates YES, and the sequence advances to step 5.

In step 5, there is started a data output of records of documents for 10 surfaces covering N-th surface through (N−9)th surface which have already been read. With regard to the recording order, in this case, reverse sides of documents are first recorded in the order of N-th surface, (N−2)-th surface, (N−4)-th surface . . . , and then the obverse sides of documents are recorded in the order of (N−1)-th surface, (N−3)-th surface, (N−5)-th surface . . . .

While conducting the aforesaid recording, it is judged in step 6 whether the data output of records for 10 surfaces covering N-th surface through (N−9)-th surface has been completed or not, and the recording is continued until it is completed. During this period, the aforesaid reading is continued. Upon completion of the data output of records for 10 surfaces, the sequence advances to step 7 where the data output of records is stopped.

Then, in step 8, existence of remaining documents which are reduced in terms of quantity by reading conducted simultaneously with the aforesaid recording is judged.

When the documents remain, the sequence advances to step 9 where it is judged whether the reading for the following 10 surfaces ((N−10)-th surface—(N−19)-th surface) has been completed or not, and during the period up to the completion of the reading, the suspension of the data output of records is maintained.

When the reading for 10 surfaces corresponding to the previous one is completed, the sequence goes back to step 5 where an output of record data covering (N−10)-th surface through (N−19)-th is started. After that, as long as remaining documents exist, the reading for 10 surfaces and an operation to output record data for 10 surfaces which have been read are repeated. Then, when feeding of documents is completed and when remaining documents are judged to have gone in step 8, the sequence advances to step 10 to stop the reading and advances to step 11 to output remaining read data as record data, and the output is judged whether it has been completed or not in step 12, and the recording is continued until the output is judged to be completed. After the recording for the first one set is completed in the aforesaid manner, the recording for the second set is subsequently conducted in accordance with data for all documents stored in the memory, and then the sequence advances to step 14 where it is judged whether any sets to be recorded remain or not, and an output of record data is repeated until the moment when the judgment indicates NO, whereby record data for the established number of sets are outputted to complete the recording.

In the method mentioned above, when plural sets are recorded one set by one set, it is possible to conduct reading immediately after the reading for 10 surfaces, while continuing the reading for all documents surfaces, thus the recording for the first one set can be completed as quickly as possible, making it possible to reduce remarkably the time required to complete the recording for plural sets.

For example, when a 2—2 mode (from double-sided document to double-sided copying) is selected, and when double-sided productivity is calculated based on the so-called BLI method (the method to calculate productivity employed by BLI in the USA), if time C1 required for the number of copies from the start of copy to completion of ejection in setting of A4 size document 10 sheets/5 sets is measured, and when C2 is assumed to represent the number of copies outputted at the maximum copying speed of the copying machine within a period of time identical to C1, it is possible to obtain the double-sided productivity from C1/C2×100 by substituting C1 and C2.

The calculating expression above makes it possible to calculate that 70% of double-sided productivity can be obtained in the method to output after reading all documents. In the present embodiment, double-sided productivity on the occasion to start outputting after reading 10 surfaces is 77%, which indicates that the double-sided productivity is improved by 7% compared with the method to output after reading all documents.

In addition to the 2—2 mode, it is also possible to apply to a 1–2 mode, and in that case, when copying beginning with the last surface in the same way as in explanation of the previous embodiment, if the number of documents set is odd, obverse sides of recording sheets are represented by even pages and the first page turns out to be blank. It is therefore preferable to apply it only when the number of documents is even. For this, it is simple and preferable that a user checks the number of documents and sets the mode, but it is possible to arrange so that a copying machine detects the number of documents set and the present mode is conducted only when the number of documents is odd. Even when feeding documents beginning with the first document, the 1–2 mode can be applied as it is.

Further, in the embodiment mentioned above, the reading speed of the automatic image reading section C requires as much as 24 seconds for 10 surfaces of double-sided document, but it is possible to complete the output within 10 seconds for 10 surfaces of double-sided copy in terms of output in double-sided copy by conducting double-sided copy at the ability identical to the maximum copying speed.

As explained above, according to the present invention, even when copy operation is conducted on both sides of recording sheets while the recording sheets are conveyed without being stacked, the copy operation can be conducted at high speed. By matching the recording operation by the recording means with the reading operation by the reading means, the productivity can be enhanced.

In the invention related to each of Items 1 and 2, processing of writing images is conducted while processing of reading images is conducted, whereby, recording for the first set can be conducted quickly, and thereby the time required for all copies at that time can be shortened as far as possible even in the mode to record plural sets of documents by recording one set by one set in the order of pages, which makes a user feel easy.

In the invention related to Item 3, reading operations are interrupted after completion of operations to read image data of the prescribed number of sheets, and then, reading and recording operations are started again after the reading operations up to the next prescribed number of sheets, thereby, when the speed of the document feeding section is lower than that of the image forming section, it is possible to arrange so that a writing area never overtakes a reading area.

The invention related to Item 4 makes it possible to apply the invention automatically to the one equipped with a mechanism to read from the last.

The invention related to Item 5 makes it possible to apply the invention automatically with two modes. The invention related to Item 6 makes it possible to conduct double-sided recording by providing a recording sheet reversing mechanism.

The invention related to Item 7 makes it possible to conduct copying for double-sided documents by providing a document reversing mechanism.

In the above embodiment, the present invention is applied to an image recording apparatus provided with an image reading section. However, the present invention is not limited to this embodiment. For example, the present invention is also applied to an image recording system in which image data are inputted from an operating section instead of the image reading section. In FIG. 3, the image data of plural pages are stored in a storage section 138 used as a first memory in an external equipment K such as a personal computer or a server. The image data are supplied from the storage section 138 and received by overall control section I and stored in a memory in an image storage section E. When the image data are supplied from the external equipment K and images are recorded on both sides of a recording sheet by the recording sheet reversing-conveyance mechanism H3 used as the recording sheet reversing means, after image data of a predetermined number of pages are received by the overall control section I and stored in the memory of the image storage section E, the image forming process section J used as the image recording means starts recording images based on the image data stored in the memory simultaneously as other image data are successively received through the overall control section I and are stored in the memory of the image storage section E.

After the image forming process section J records the image data of the predetermined number of pages, the image forming process section J stops the recording to wait until image data of the predetermined number of pages are received further by the overall control section I.

As stated above, the receiving by the overall control section I and the recording by the image forming process section J are conducted simultaneously for an initial set of recording sheets and the recording by the image forming process section J is conducted based on the image data stored in the memory of the image storage section E for the other sets of recording sheets.

What is claimed is:

1. An image forming apparatus for producing a copy set of a document having "N" plural original pages by recording two original pages of the plural original pages on both sides of respective recording sheets, said image forming apparatus comprising:

an image reading device that reads an image on each of the plural original pages at a reading section and then outputs image data;

a memory that stores the image data therein;

an image recording device that records an image on an original page on one side of one of the recording sheets based on the image data stored in the memory so that a one-sided recording sheet bearing an image on one side thereof is produced;

a sheet feeder that feeds the recording sheets to the is image recording device;

a re-conveying device comprising a reversing device and a re-conveyance passage that re-convey the one-sided recording sheet bearing the image on one side thereof from the image recording device to the image recording device, wherein the reversing device reverses the one-sided recording sheet so that the image recording device can record another image on the other side of the one-sided recording sheet, and wherein the re-conveyance passage has a length to convey "m" plural one-sided recording sheets serially simultaneously so that the re-conveying device re-conveys the plural one-sided recording sheets to the image recording device without stacking the plural one-sided recording sheets on an intermediate tray, where N>(2×m);

a controller that controls the image recording device, the sheet feeder and the re-conveying device such that after the image reading device reads (2×m) original pages of the plural original pages and the memory stores the image data of the (2×m) original pages, the image recording device starts recording to record images based on the image data of the (2×m) original pages stored in the memory onto both sides of "m" recording sheets while the image reading device successively reads (N−(2×m)) remaining original pages of the plural original pages.

2. The image forming apparatus of claim 1, wherein the controller controls the image recording device, the sheet feeder and the re-conveying device so as to produce plural copy sets of the document based on the image data stored in the memory.

3. The image forming apparatus of claim 2, wherein after the image reading device reads (2×m) original pages of the plural original pages, reading by the image reading device and recording by the image recording device are conducted concurrently for a first copy set of the document, and recording by the image recording device is conducted for another copy set of the document based on the image data stored during production of the first copy set.

4. The image forming apparatus of claim 1, wherein after the image reading device reads (2×m) original pages of the plural original pages, the controller judges whether original pages to be read remain or not, and if original pages to be read remain, the image recording device starts recording again after another (2×m) original pages are read by the image reading device.

5. The image forming apparatus of claim 1, wherein after the image recording device records the image data of the (2×m) original pages, the image recording device stops recording and delays the recording until another (2×m) original pages are read by the image reading device.

6. The image forming apparatus of claim 1, wherein the image recording device comprises a document feeder that feeds an original sheet to the reading section and an original sheet reversing device that reverses a both-sided original sheet so that the document feeder feeds the reversed both-sided original sheet to the reading section.

7. The image forming apparatus of claim 1, wherein the re-conveying device re-conveys the "m" recording sheets as one unit on the re-conveyance passage.

8. An image forming system for producing a copy set of a document having "N" plural original pages by recording two original pages of the plural original pages on both sides of respective recording sheets, said image forming system comprising:

a first memory in which image data of the plural original pages are stored;

an image recording apparatus comprising an image data receiving section that receives the image data stored in the first memory, and a second memory that stores the image data received by the image data receiving section;

an image recording device that records an image on an original page on one side of one of the recording sheets based on the image data stored in the second memory so that a one-sided recording sheet bearing an image on one side thereof is produced;

a sheet feeder that feeds the recording sheets to the image recording device;

a re-conveying device comprising a reversing device and a re-conveyance passage that re-convey the one-sided recording sheet bearing the image on one side thereof from the image recording device to the image recording device, wherein the reversing device reverses the one-sided recording sheet so that the image recording device can record another image on the other side of the one-sided recording sheet, and wherein the re-conveyance passage has a length to convey "m" plural one-sided recording sheets serially simultaneously so that the re-conveying device re-conveys the plural one-sided recording sheets to the image recording device without stacking the plural one-sided recording sheets on an intermediate tray, where N>(2×m);

a controller that controls the image recording device, the sheet feeder and the re-conveying device such that after the image data receiving section receives (2×m) original pages of the plural original pages and the second memory stores the image data of the (2×m) original pages, the image recording device starts recording to record images based on the image data of the (2×m) original pages stored in the second memory onto both sides of "m" recording sheets while the image data receiving section successively receives (N−(2×m)) remaining original pages of the plural original pages.

9. The image forming system of claim 8, wherein the controller controls the image recording device, the sheet feeder and the re-conveying device so as to produce plural copy sets of the document based on the image data stored in the second memory.

10. The image forming system of claim 9, wherein after the image data receiving section receives (2×m) original pages of the plural original pages, receiving by the image data receiving section and recording by the image recording device are conducted concurrently for a first copy set of the document, and recording by the image recording device is conducted for another copy set of the document based on the image data stored during production of the first copy set.

11. The image forming apparatus of claim 8, wherein after the image data receiving section receives (2×m) original pages of the plural original pages, the controller judges whether original pages to be received remain or not, if original pages to be received remain, the image recording device starts recording again after another (2×m) original pages are received by the image data receiving section.

12. The image forming apparatus of claim 8, wherein after the image recording device records the image data of the (2×m) original pages, the image recording device stops recording and delays the recording until another (2×m) original pages are received by the image data receiving section.

* * * * *